(12) United States Patent
Amino et al.

(10) Patent No.: US 7,960,876 B2
(45) Date of Patent: Jun. 14, 2011

(54) MAGNET ROTOR, ELECTROMAGNETIC DRIVE DEVICE AND LIGHT QUANTITY ADJUSTMENT DEVICE USING THE MAGNET ROTOR

(75) Inventors: Keijirou Amino, Minami-Alps (JP); Akira Hakozaki, Kai (JP); Katsura Nakajima, Nirasaki (JP)

(73) Assignee: Nisca Corporation, Yamanashi (JP)

( * ) Notice: Subject to any disclaimer, the term of this patent is extended or adjusted under 35 U.S.C. 154(b) by 81 days.

(21) Appl. No.: 12/385,479

(22) Filed: Apr. 9, 2009

(65) Prior Publication Data

US 2009/0195851 A1 Aug. 6, 2009

Related U.S. Application Data (62) Division of application No. 11/410,249, filed on Apr. 25, 2006, now Pat. No. 7,685,698.

(30) Foreign Application Priority Data

May 31, 2005 (JP) .................. 2005-159895

(51) Int. Cl.
*H02K 33/00* (2006.01)
*H02K 7/06* (2006.01)
*H02K 37/00* (2006.01)
*F21V 17/00* (2006.01)

(52) U.S. Cl. ................ 310/21; 310/20; 310/22; 310/37; 310/38; 310/49.01; 362/324

(58) Field of Classification Search ............... 310/21, 310/22, 37, 38, 49.01, 20; 362/324
See application file for complete search history.

(56) References Cited

U.S. PATENT DOCUMENTS

2004/0081451 A1 * 4/2004 Takada .................. 396/508

FOREIGN PATENT DOCUMENTS

| JP | 03045668 A | * | 2/1991 |
| JP | 08019239 A | * | 1/1996 |
| JP | 2001178040 A | * | 6/2001 |

OTHER PUBLICATIONS

Machine Translation JP08019239 (1996) and JP2001178040 (2001).*

* cited by examiner

*Primary Examiner* — Quyen Leung
*Assistant Examiner* — Jose A Gonzalez Quinones
(74) *Attorney, Agent, or Firm* — Manabu Kanesaka (57) ABSTRACT

A magnet rotor includes a drive arm with a rotary shaft, and an anisotropic permanent magnet having an axis of magnetization. The drive arm is composed of a light transmitting resin. The magnet has a cylindrical shape with a hollow center portion through which the rotary shaft is disposed. The drive arm and the permanent magnet are bonded together by a light curable resin adhesive.

9 Claims, 13 Drawing Sheets

MAGNET ROTOR, ELECTROMAGNETIC DRIVE DEVICE AND LIGHT QUANTITY ADJUSTMENT DEVICE USING THE MAGNET ROTOR

CROSS-REFERENCE TO RELATED APPLICATION

This is a divisional application of Ser. No. 11/410,249 filed on Apr. 25, 2006, now U.S. Pat. No. 7,685,698 issued on Mar. 30, 2010.

BACKGROUND OF THE INVENTION AND RELATED ART STATEMENT

The invention relates to a magnet rotor used for a light quantity adjustment device and as a drive source of an electromagnetic drive device used for the light quantity adjustment device. The device typically adjusts photographic light quantity or projecting light quantity by open/closed driving blade members such as a shutter blade, diaphragm blade and the like in optical equipment such as imaging devices like a still camera, video camera and so on, or projecting devices like a rear projection television, a front projector and so on.

Generally, this kind of light quantity adjustment device adjusts light quantity passing through an optical path by arranging a blade member in the optical path and by opening/closing the blade member by an electromagnetic drive device. The electromagnetic drive device includes a magnet rotor in which a rotary shaft is provided at the center of a permanent magnet and a stator in which an excitation coil is wound around a periphery of a coil frame. The magnet rotor is rotated to a predetermined angle by turning on electricity to the excitation coil, to open/close the blade member.

As the magnet rotor used for the above-described electromagnetic drive device, one in which a rotary shaft of a drive arm is pressed into a central through hole of a permanent magnet to be united with each other as disclosed in JP-A-8-19239, one in which a rotary shaft is bonded to a permanent magnet by an adhesive to be united with each other as disclosed in JP-A-9-56092, and further one in which molding material such as resin is inserted into a magnet having a hollow cylindrical shape to be united with each other as disclosed in JP-A-6-258683 and the like are known.

These methods for uniting the magnet rotor are used respectively according to the compatibility to certain devices, and the present application relates to an adhesion method among these methods.

In the past, in the adhesion method, two-component epoxy resin has been used in general for an adhesive thereof. The reason why the two-component epoxy resin has been used is that, first, it is easy to deal with because the curing starts by mixing the adhesive with a curing agent when using the adhesive. Secondly, the adhesive has a long curing time and is not cured during a positioning time which is required for positioning a direction of the drive arm and a direction of an axis of easy magnetization of the permanent magnet to a prescribed relation in the magnet rotor. As a result, the two-component epoxy resin is suitable for use as an adhesive of the magnet rotor.

One-component epoxy resin is also known as an adhesive. However, the one-component epoxy resin is cured by being exposed to air. The adhesive applied between the rotary shaft of the drive arm and the central through hole of the permanent magnet is difficult to cure since it is hardly exposed to air, therefore, the resin is not regularly used.

However, the above two-component epoxy resin is used by mixing the adhesive with the curing agent. When used, therefore, there arose problems such as adhesion failure of curing spots caused by a poor mixing state. Additionally, there was rotation failure caused by adhesive flowing out of a bearing portion of the rotary shaft as a result of the long curing time, such as in the case of adhesive being applied between the rotary shaft of the drive arm and the central through hole of the permanent magnet when a device diameter becomes small in accordance with miniaturization.

An object of the invention, therefore, is to provide a magnet rotor, an electromagnetic drive device and a light quantity adjusting device using the magnet rotor. According to the invention, in manufacturing the magnet rotor, the adhesive is not mixed with a curing agent as in the conventional way, and curing start time can be controlled. Secondly, after the curing starts, the resin is cured immediately with no leakage, even in a sealed portion, and it is securely cured without curing spots.

Further objects and advantages of the invention will be apparent from the following description of the invention.

SUMMARY OF THE INVENTION

The invention has the following structure for solving the above-described prior art problems.

First, as a manufacturing method of a magnet rotor of the invention, in a magnet rotor formed by uniting a drive arm having a rotary shaft with a hollow-cylindrical shaped permanent magnet through which the rotary shaft of the drive arm is pierced, using an adhesive made of a light curable resin, the drive arm is formed of light transmitting polycarbonate (PC) resin in advance, and the permanent magnet is formed of a neodymium (Nd) anisotropic magnet having an axis of easy magnetization. Then, as a first process, the drive arm is positioned and held in a fixing portion of a fixture having the fixing portion in which a magnetic field is formed in a prescribed direction, taking a prescribed posture with respect to the direction of the magnetic field.

As a second process, a light curable resin is applied to the rotary shaft of the drive arm which has been positioned and held.

As a third process, a hollow portion of the permanent magnet is fitted to the rotary shaft of the drive arm to which the light curable resin has been applied.

As a fourth process, the permanent magnet is magnetically held at a position where the direction of the axis of easy magnetization corresponds to the direction of the magnetic field.

As a fifth process, ultraviolet light (UV), an electron beam (EV), or a visible light or the like is irradiated, allowing it to be transmitted through the drive arm in the state of holding magnetism so as to cure the light curable resin.

As a sixth process, the permanent magnet and the drive arm which has been bonded by the light curable resin are removed from the fixture to manufacture the magnet rotor.

According to another embodiment of the invention, an electromagnetic drive device provides rotational torque to the magnet rotor manufactured by the above method. According to a conducting direction of electric current supplied to the excitation coil, a light quantity adjustment device installed in a substrate having an optical axis opening in the electromagnetic drive device opens/closes drive blade members thus regulating the optical axis opening.

The magnet rotor is especially suitable for a magnet rotor of an electromagnetic drive device. The device includes a magnet rotor having a cylindrical shaped permanent magnet, especially with a rotary shaft at the center, a coil frame having a pair of bearings rotatably supporting both ends of the rotary shaft, an excitation coil wound at a periphery of the coil frame, and a yoke made of soft magnetic material, which is arranged at the periphery of the coil frame. One of the pair of bearings has a conic-shaped tapered surface of which its center is the center axis of the rotary shaft, a sphere surface is provided at the rotary shaft, the center of which is the center axis thereof, and the sphere surface formed at the rotary-shaft is abutted on the tapered surface of the bearing. A biasing effect that biases the sphere surface toward the side of the tapered surface is given to the rotary shaft.

In summary, the magnet rotor manufactured by the method of the invention operates smoothly, and the bearing portion is not stained by an adhesive.

DETAILED DESCRIPTION OF THE PREFERRED EMBODIMENTS

Hereinafter, the present invention will be described in detail based on a preferred embodiment thereof.

First, details of an electromagnetic drive device 40 will be explained with reference to FIGS. 2-7. Various kinds of drive devices such as a normal electromagnetic motor can be applied as the electromagnetic drive device 40, for example, the following structure is preferable. A magnetic rotor 41 includes a cylindrical permanent magnet 42 having a rotary shaft 43 to which a drive arm 44 is integrally formed, the rotor 41 is bearing-supported rotatably in a coil frame 46, and a coil 49 is wound around the coil frame 46 to form a stator. Then, the magnet rotor 41 is rotated within a prescribed angle in a magnetic field brought about by the coil 49 with respect to the N-S magnetic pole of the magnet rotor 41, a periphery of which is covered with a yoke 52.

The drive arm 44 is provided with drive pins 44*a*, 44*b* at both tip portions of an arm portion shown in the drawing. Specifically, the drive arm 44 having a pair of drive pins 44*a*, 44*b* is provided at the rotary shaft 43 of the electromagnetic drive device 40, and the rotation of the rotary shaft 43 transmits motions in opposite directions to each other to the pair of drive pins 44*a*, 44*b* which are disposed at a distance.

Therefore, it is not necessary to install the drive arm 44 integrally to the rotary shaft 43 of the electromagnetic drive device 40. It is preferable, for example, that a ring-shaped transmission member is installed to a substrate 30 rotatably, rotary motion is brought about by connecting the transmission member to the rotary shaft of the drive device, and drive pins are provided at the transmission member.

Figure 1:
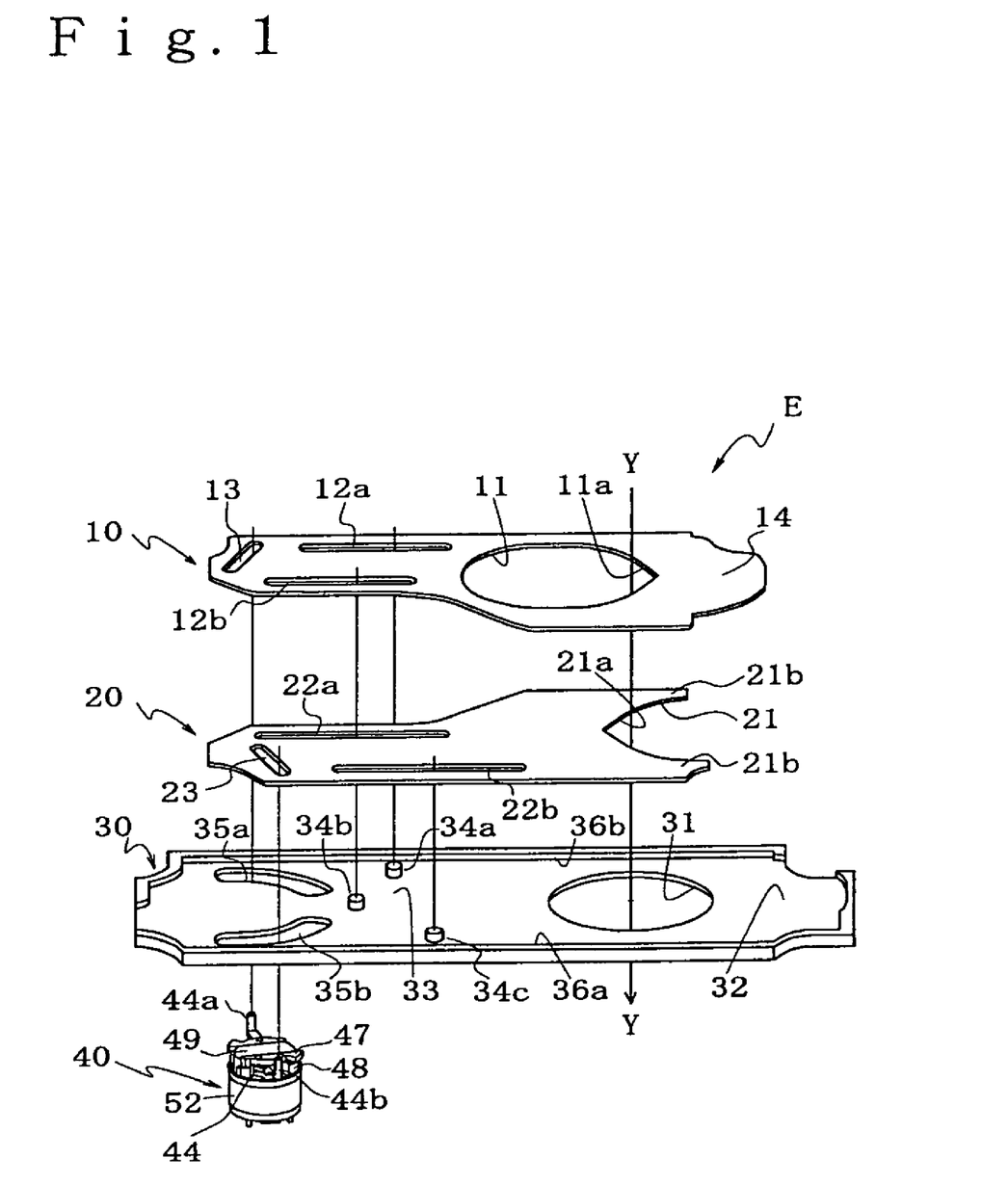
FIG. 1 is an exploded perspective view of a light quantity adjustment device according to the invention.
Figure 2:
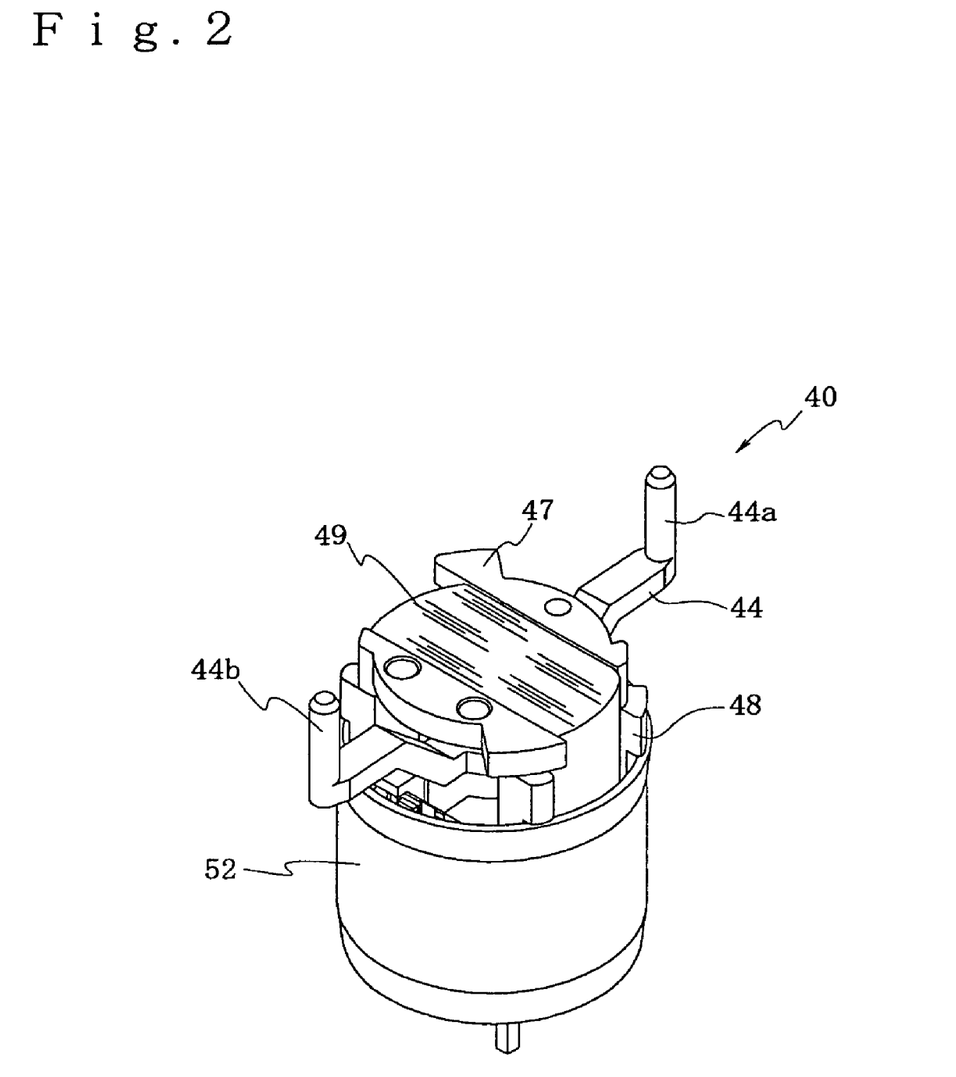
FIG. 2 is a perspective view seen from above an electromagnetic drive device as a drive source of the light quantity adjustment device of the invention.

The electromagnetic device 40 thus constructed is fixed by screws and the like at the reverse of the side of the substrate 30 in which blade members are arranged, clearance grooves 35*a*, 35*b* of the drive pins 44*a*, 44*b* are formed at the substrate 30 as shown in FIG. 1, and slit holes 13, 23 in which the drive pins 44*a*, 44*b* are engaged are provided in the a first and second blade members. The drive pins 44*a*, 44*b* are inserted into the clearance grooves 35*a*, 35*b* and protrude through the surface of the substrate 30 in which the blade members are arranged. The drive pins 44*a*, 44*b* provided to the drive arm 44 are connected to the slit holes 13, 23 of the first and second blade members 10, 20.

Next, the coil frame 46 rotatably supporting the magnet rotor 41 will be described in detail. The coil frame 46 is divided into two bodies, namely, an upper coil frame 47 and a lower coil frame 48 as shown in a perspective view in FIG. 4 and a side cross-sectional view in FIG. 8. At a mating face, apertures from which the drive arm 44 protrudes at both sides are provided, and a recessed ring groove in which the coil 49 is wound is formed at a periphery.

Further, in the lower coil frame 48, a cutout portion into which a printed plate 51 is inserted is formed, in which a Hall device 50 which detects a rotational position of the magnet rotor 41 by detecting variation of magnetic flux of the permanent magnet 42 is soldered.

Figure 3:
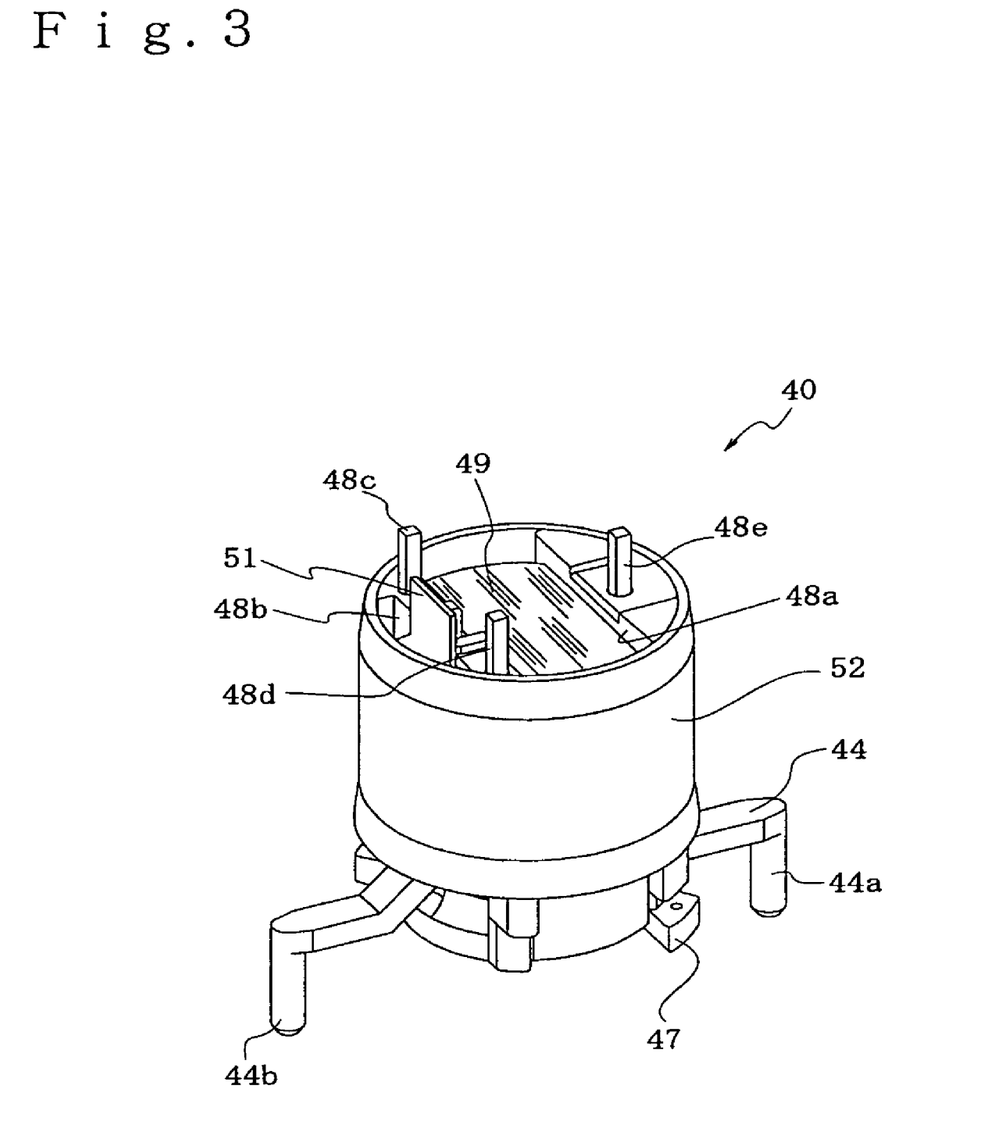
FIG. 3 is a perspective view seen from below the electromagnetic drive device as the drive source of the light quantity adjustment device of the invention.
Figure 4:
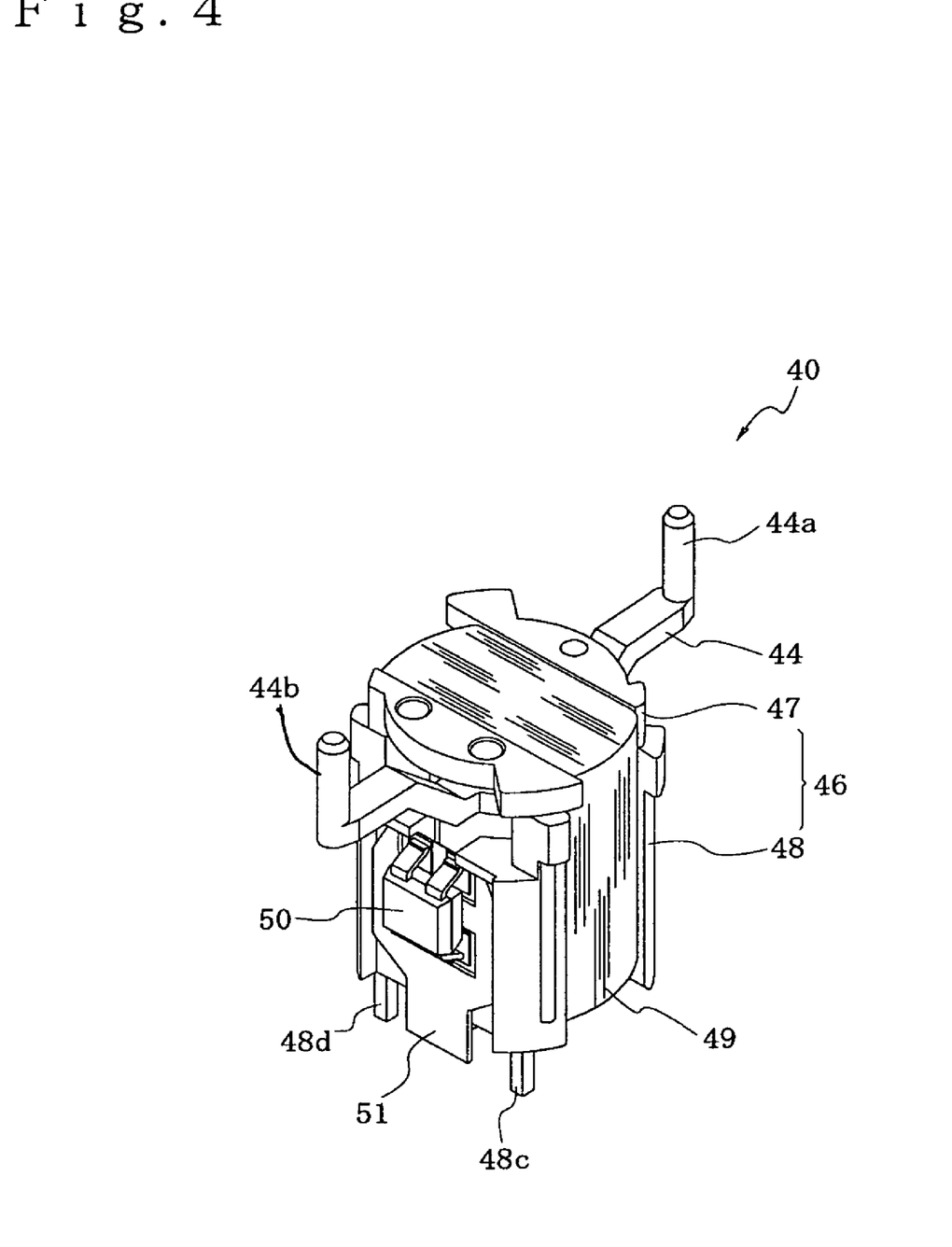
FIG. 4 is a perspective view seen from above in a state of removing a yoke of the electromagnetic drive device as the drive source of the light quantity adjustment device of the invention.
Figure 5:
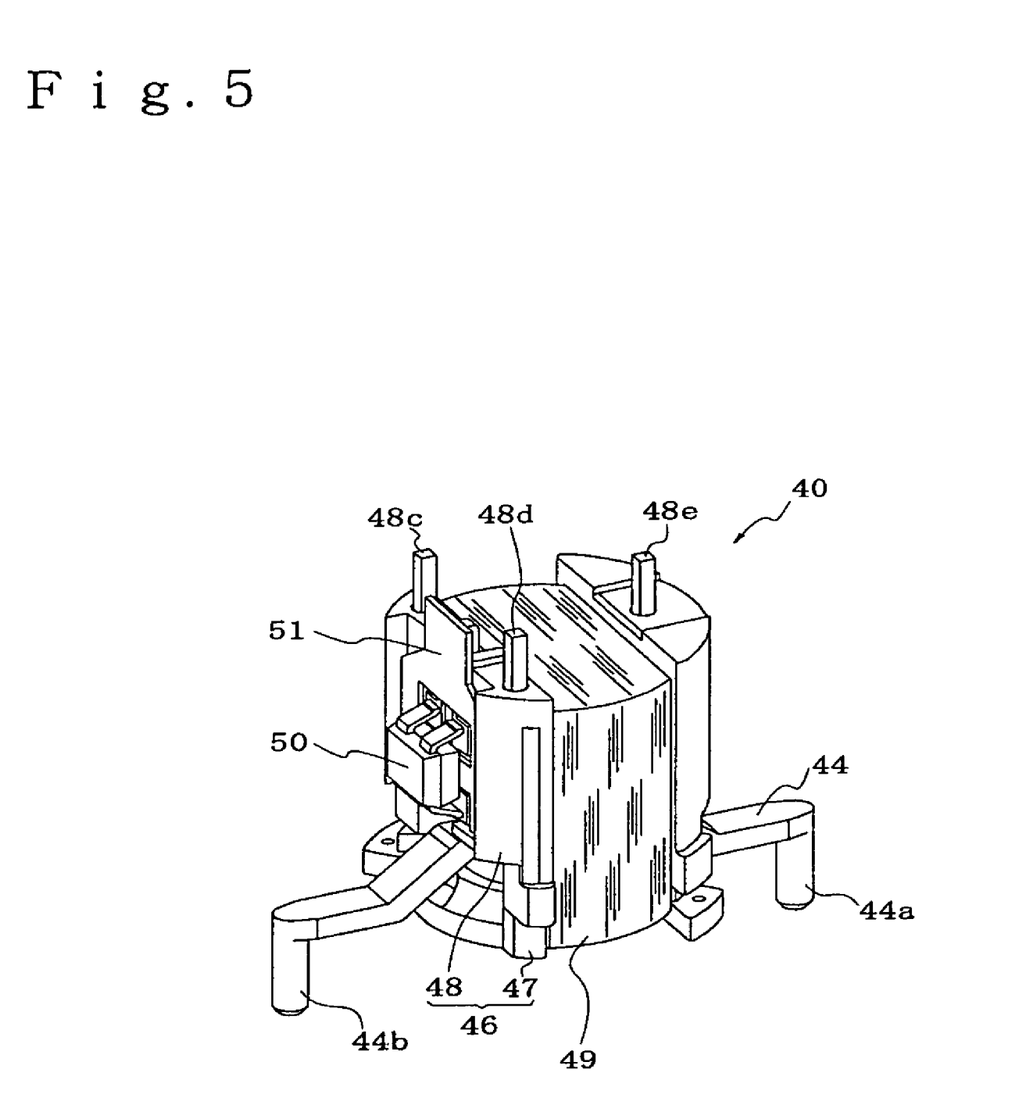
FIG. 5 is a perspective view seen from below in a state of removing the yoke of the electromagnetic drive device as the drive source of the light quantity adjustment device of the invention.
Figure 6:
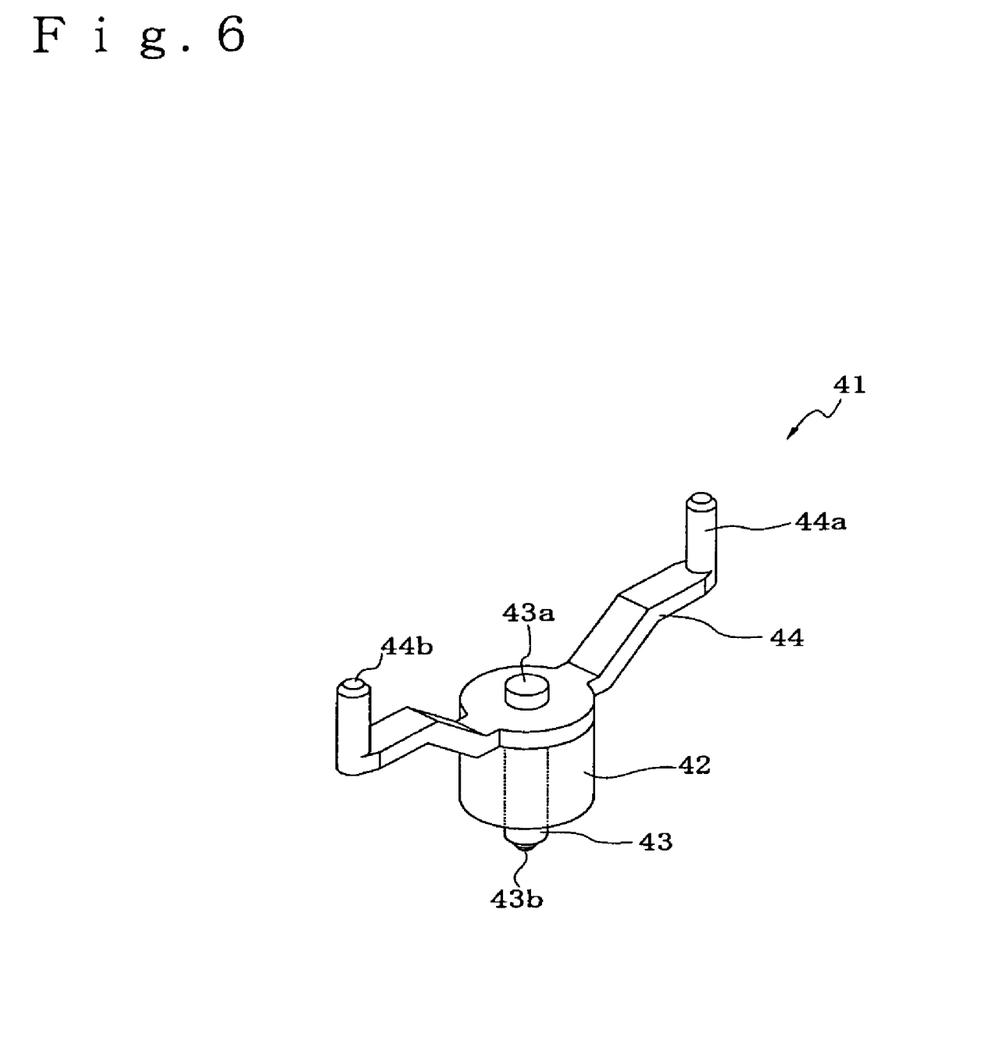
FIG. 6 is a perspective view seen from above a magnet rotor of the invention.
Figure 7:
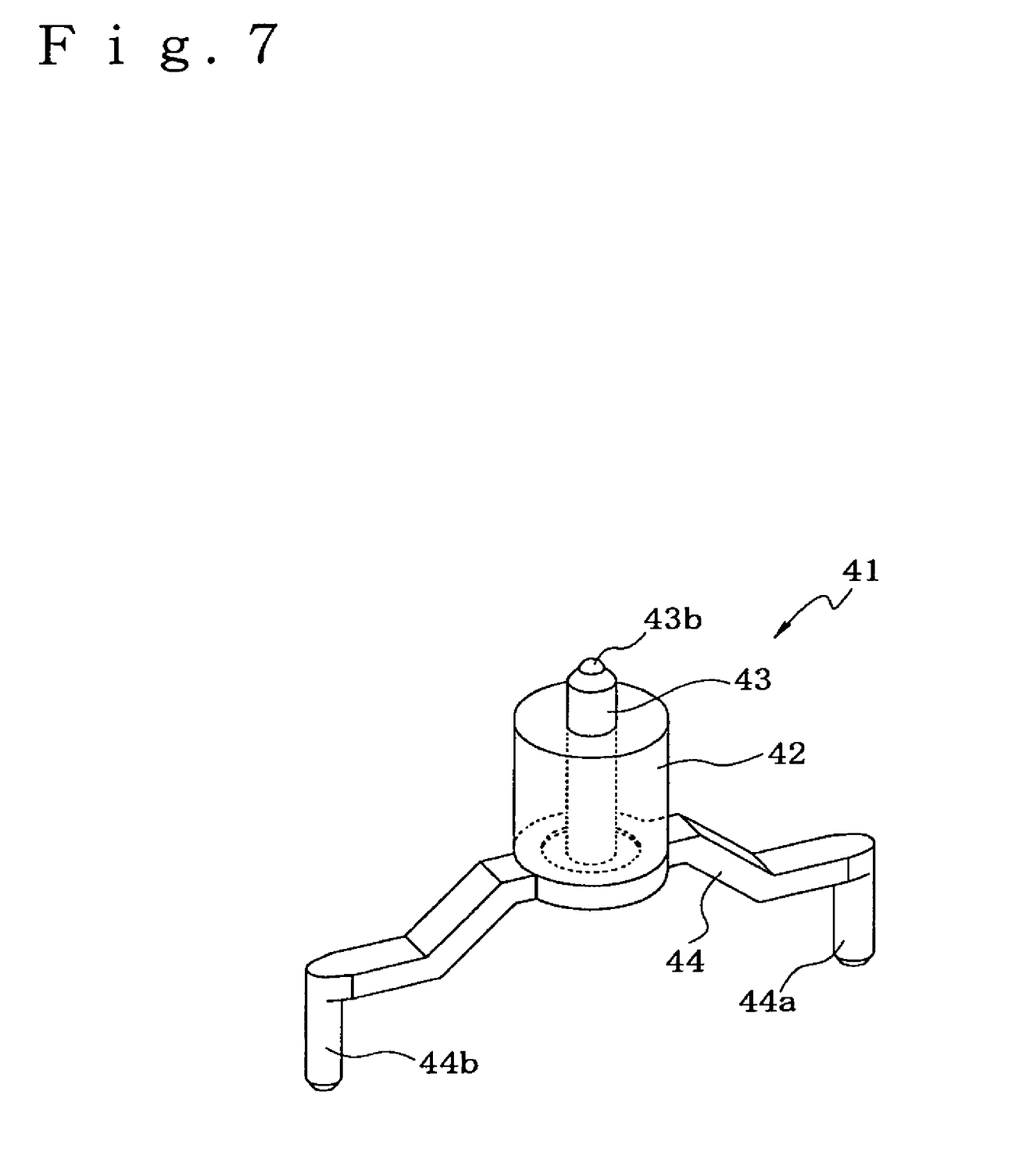
FIG. 7 is a perspective view seen from below a magnet rotor of the invention.

Connection terminals 48*c*, 48*d* used for leads of the coil 49, which are made of phosphor-bronze conductive metal bars, are pressed into a bottom surface of the lower coil frame 48, as shown in FIG. 3 and FIG. 5. An auxiliary terminal 48*e* is provided for supporting a printed substrate (not shown) at three points so that the substrate does not pull away from the bottom surface of the lower coil frame 48, to which the connection terminals 48*c*, 48*d* are pierced and soldered to be electrically connected to an external control circuit.

A yoke 52 fitted outside of the coil frame 46, shielding the frame magnetically, is provided. Regarding the fitting position of the yoke 52, as shown in the sectional view of FIG. 8, with respect to a central position of a longitudinal direction of the permanent magnet 42 included in the magnet rotor 41 which is rotatably supported by the coil frame 46, a central position in the same direction of the yoke 52 is displaced at displacement amount "L" in advance. According to the displacement, the permanent magnet 42 always receives magnetic biasing force moving to the central position of the yoke 52 so that the magnetic balance becomes equal. According to the biasing force "F," a lower end shaft-receiving portion 43*b* of the rotary shaft 43 of the magnet rotor 41 always abuts and holds on a tapered surface 48*a* of the lower coil frame 48, though the difference of biasing force occurs in some degree by the posture difference. As a result, an outline becomes spherical so that the center of the sphere is on the rotation center axis to construct a bearing in a pressure contact state to each other. Namely, as is the case with the well-known V-block principle, when the rotary shaft 43 is pressed and biased to the tapered surface 48a, a center axis of the tapered surface 48a corresponds to a center axis of the rotary shaft 43.

Figure 8:
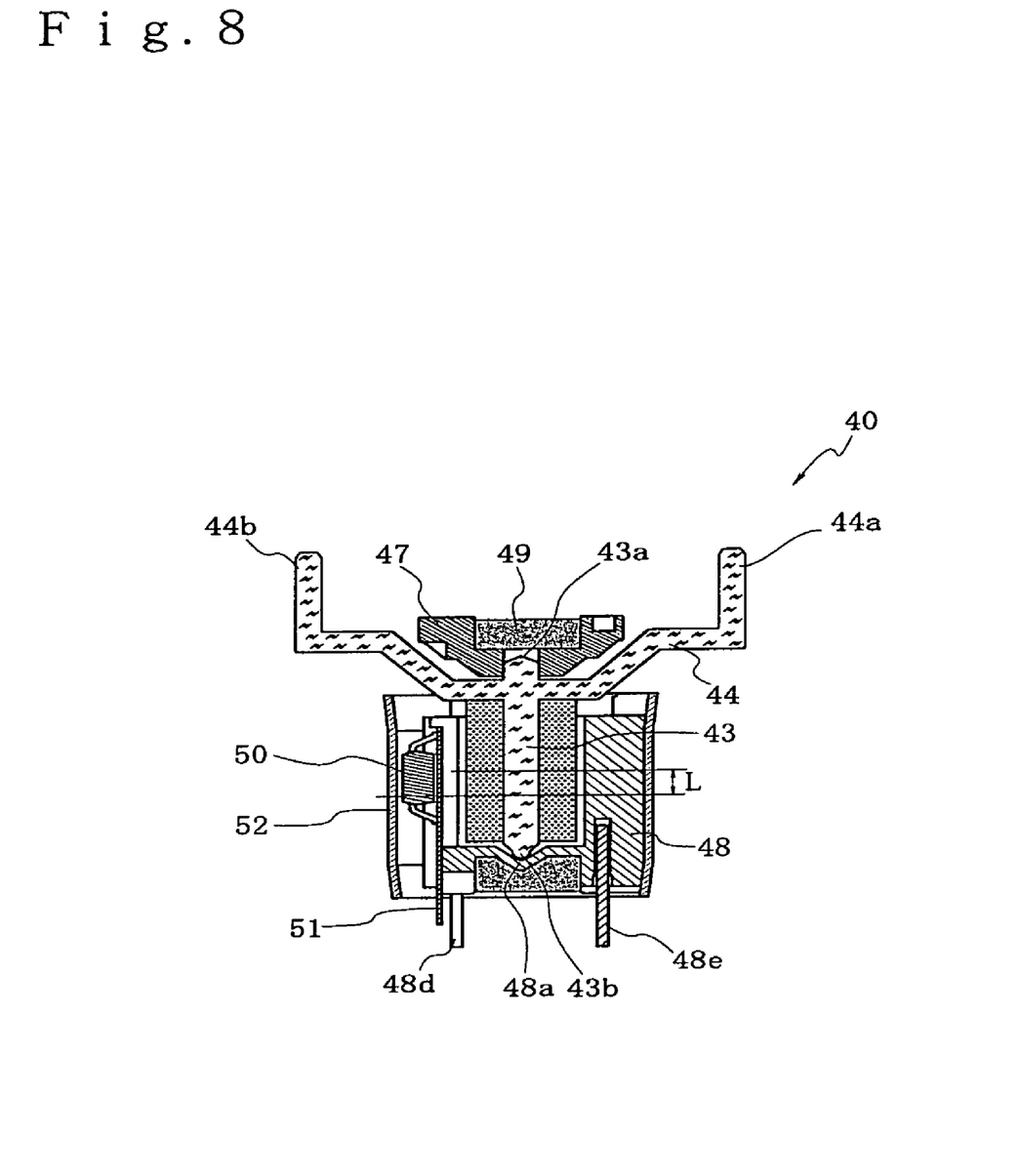
FIG. 8 is a side cross-sectional view of the electromagnetic drive device of the invention.
Figure 9:
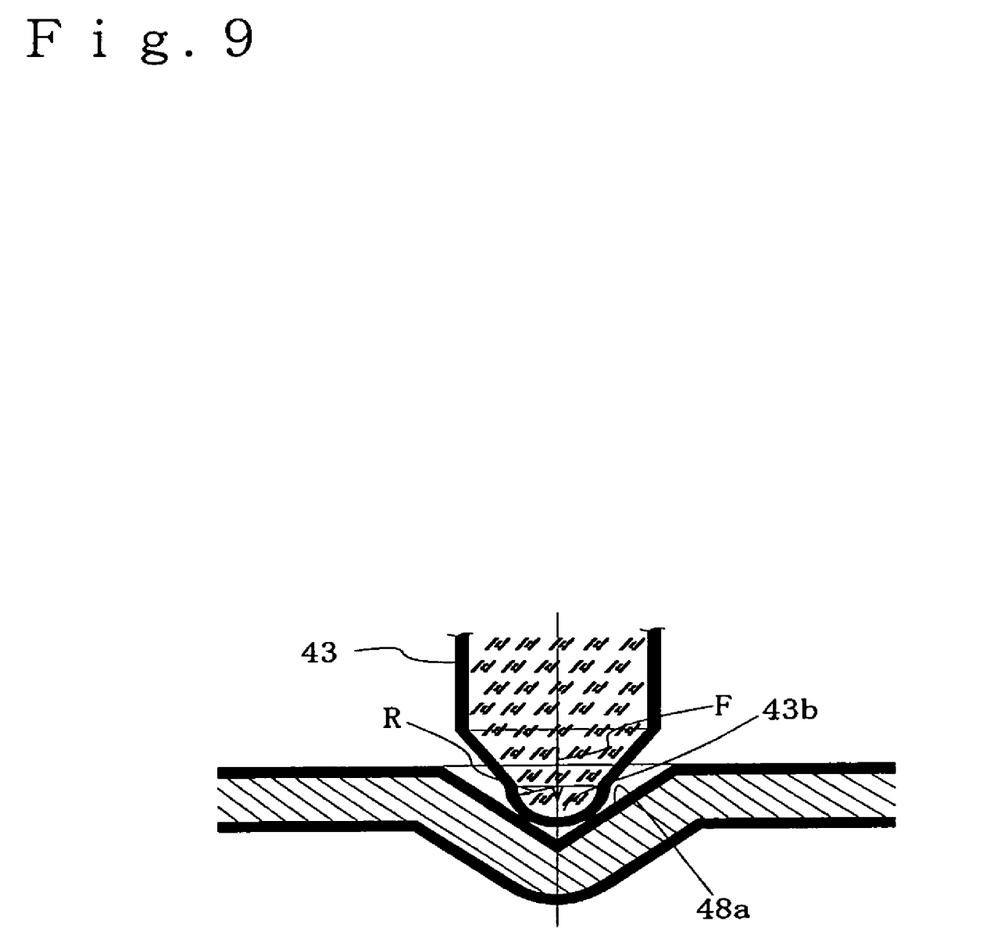
FIG. 9 is an enlarged sectional view depicting a bearing structure of the electromagnetic drive device of the invention.

As a result, the rotary shaft 43 of the magnet rotor 41 always rotates about the center axis of the tapered surface 48a regardless of the posture difference of the electromagnetic drive device 40. Therefore, the fixing size of the rotary shaft 43 and the tapered surface 48a can be reduced to be as small as possible because swing at rotation reduces. As a result, miniaturization of the device can be achieved by reducing the fixing size.

Next, a light quantity adjustment device "E" to which the above electromagnetic drive device 40 is applied will be explained. As shown in FIG. 1, the light quantity adjustment device "E" includes a substrate 30 having an optical path opening, a pair of blade members 10, 20 built into the substrate 30, and a drive device 40 which opens and shuts the blade members.

The substrate 30 which is mold-formed of synthetic resin or press-formed of a metal plate supports the blade members described later so as to open/close freely, formed into a shape according to a space in which a camera apparatus and the like are built, and in a form in which a drive device open/close-drives the blade members can be installed. An optical path opening 31 is formed in the substrate 30, which has a photographic optical axis Y-Y of the camera apparatus and the like as a center axis. The optical path opening 31 is formed to have a diameter slightly larger than a maximum diameter of the optical path required for photographing. A plurality of blade members 10 and 20 are arranged to the optical opening 31. In the drawing, the first blade member 10 and the second blade member 20 are included.

After adjusting a diaphragm blade which adjusts light quantity passing through the optical opening 31 to be large or small, a shutter blade closing the optical opening 31 and light quantity (light exposure) of the optical opening 31, shapes of the first and second blade members 10, 20 are formed into forms suitable for any of the functions of the above, including a shutter blade combined with a diaphragm which closes the optical path. In the drawing, they are formed in the shape shown in the drawing as the shutter blade combined with the diaphragm. Specifically, the first blade member 10 includes an opening 11, a diaphragm-formed surface 11a in which one part of an edge of the opening 11 is formed to be sharp and a shutter function portion 14 which covers a part of the optical opening 31. The second blade member 20 includes a semicircular opening 21 and a diaphragm-formed surface 21a in which one part of an edge of the opening 21 is formed to be sharp.

As the shapes of the first and second blade members 10, 20, different shapes are adopted respectively depending on whether they are supported on the substrate 30 so as to slide freely or to turn freely, or whether they have two blades or plural blades of three or more. In the drawing, two blades move (slide) in opposite directions on the same straight line, therefore, the first blade member 10 is required to have the opening 11 which forms a right-side half arc, and the second blade member 20 is required to have the opening 21 which forms a left-side half arc.

Consequently, the optical path opening 31 can be opened or closed by the right-and-left half circle opening 11 and opening 21 coming close to each other and drawing away from each other. In the drawing, in order to control light exposure for photographing, the diaphragm-formed surface 11a having a sharp tip is formed at the opening of the first blade member 10, and the similar diaphragm-formed surface 21a is formed at the second blade member 20, respectively. A diaphragm diameter of almost rhombic shape is formed by the first and second blade members 10, 20 and light quantity passing through the opening 11 is adjusted in a nearest opening diameter by adjusting the diaphragm diameter to a large or small diameter.

Therefore, shapes of the opening 11 and the opening 21 are decided according to the shapes into which the diaphragm diameter is to be inserted. Guide ribs 36a, 36b and guide pins 34a, 34b and 34c are formed in the substrate 30, which guide the first blade member 10 and the second blade member 20 so as to slide freely, and guide grooves 12a, 12b are formed in the first blade member 10 and guide grooves 22a, 22b are formed in the second blade member 20. Specifically, the first blade member 10 has the opening 11, the guide grooves 12a, 12b which are parallel to each other are formed there, the guide pin 34a implanted in the substrate 30 is engaged in the guide groove 12a, and the guide pin 34b is engaged in the guide groove 12b.

A side edge of the first blade member 10 (upper side in FIG. 1) is engaged with the guide rib 36b formed in the substrate 30. Therefore, the first blade member 10 is guided along guide pins 34a, 34b and the guide rib 36b so as to slide freely in right-and-left directions in FIG. 1. Similarly, the second blade member 20 includes the opening 21, guide grooves 22a, 22b parallel to each other are formed therein, the guide pin 34b is fitted to the guide groove 22a, and the guide pin 34c is fitted to the guide groove 22b respectively. A side edge of the second blade member 20 (lower side in FIG. 1) is engaged with the guide rib 36a formed in the substrate 30.

According to the structure as described above, the first blade member 10 and the second blade member 20 are supported on the substrate 30 so as to slide freely in the same straight line (right-and-left directions in FIG. 1). Therefore, the first and second blade members 10, 20 can move freely in the direction passing over the optical path opening 31 formed in the substrate 30 respectively. Then, the above drive device 40 is fixed at a reverse of the side of the substrate 30 in which the blade members are arranged by screws and the. like, the substrate 30 is provided with the clearance grooves 35a, 35b of the drive pins-44a, 44b and the first and second blade members 10, 20 are provided with slit holes 13, 23 which are engaged with the drive pins 44a, 44b. The drive pins 44a, 44b are inserted in the clearance grooves 35a, 35b and protrude through the surface of the substrate 30 in which the blade members are arranged. Then, the drive pins 44a, 44b provided at the drive arm 44 are connected to the slit holes 13, 23 of the first and second blade members 10, 20.

In the invention, it is not necessary to install the drive arm 44 integrally to the rotary shaft 43 of the electromagnetic drive device 40. It is preferable, for example, that a ring-shaped transmission member is installed to a substrate 30 rotatably, that rotary motion is brought about by connecting the transmission member to the rotary shaft of the drive device, and that drive pins are provided to the transmission member.

Figure 10:
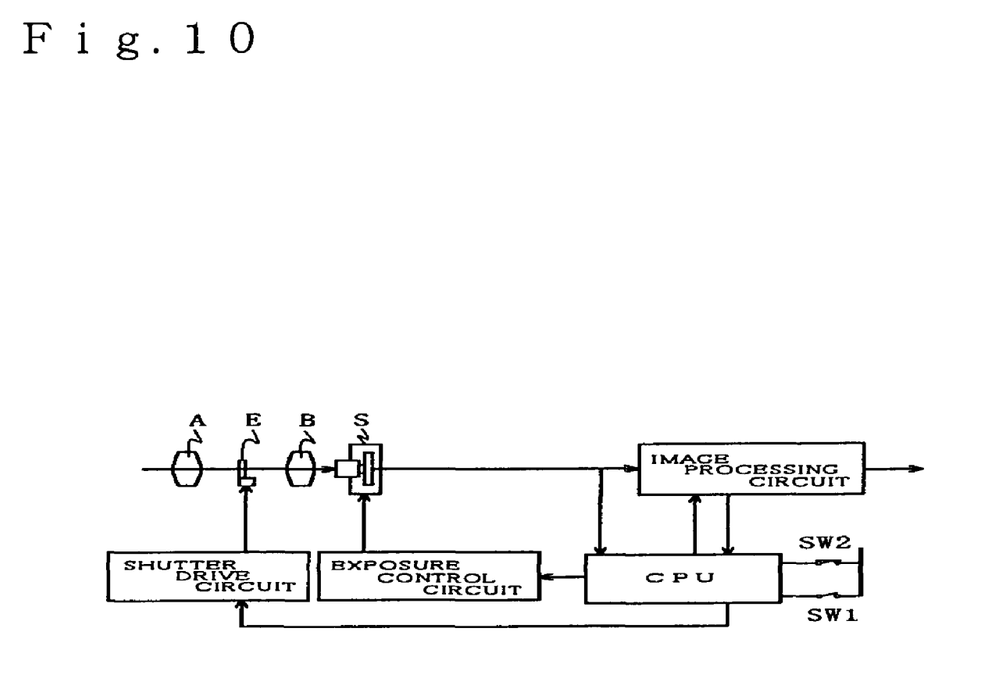
FIG. 10 is a configuration schematic of an imaging device having the light quantity adjustment device according to the invention.

An imaging device using the above light quantity adjustment device "E" will be explained with reference to FIG. 10.

The light quantity adjustment device "E" is built into a lens barrel of a still camera, a video camera and the like. Reference character "A" in the drawing denotes a front lens and "B" is a back lens arranged in a photographic optical path, and a subject image is focused by these lenses and an imaging means "S" disposed at an imaging surface. As the imaging means "S," a solid-state image sensor such as a CCD, a sensitive film, or the like is used. The control is performed by a CPU control circuit, an exposure control circuit, and a shutter drive circuit. Reference character "SW1" in the drawing denotes a main power switch and "SW2" denotes a shutter relays switch. In addition to the above, an autofocus circuit and the like are used for the control for a camera apparatus. However, since that structure is well-known, explanation thereof is omitted.

The substrate 30 is installed between the front lends "A" and the back lens "B" built into the lens barrel. The above first and second blade members 10, 20 and the drive device 40 are built into the substrate 30 to be unitized as the light quantity adjustment device. The control CPU sets photographic conditions such as light exposure, shutter speed and the like, and generates instruction signals to the exposure control circuit and the shutter drive circuit. Regarding the light exposure, the exposure control circuit supplies the coil of drive device 40 with electric current in a prescribed direction by the instruction signal from the control CPU. Then, the first and second blade members 10, 20 receive the rotation of the drive device 40 transmitted from the drive pins 44a, 44b through the drive arm 44 to form the optical path opening 31 to provide an optimum light exposure.

Figure 11:
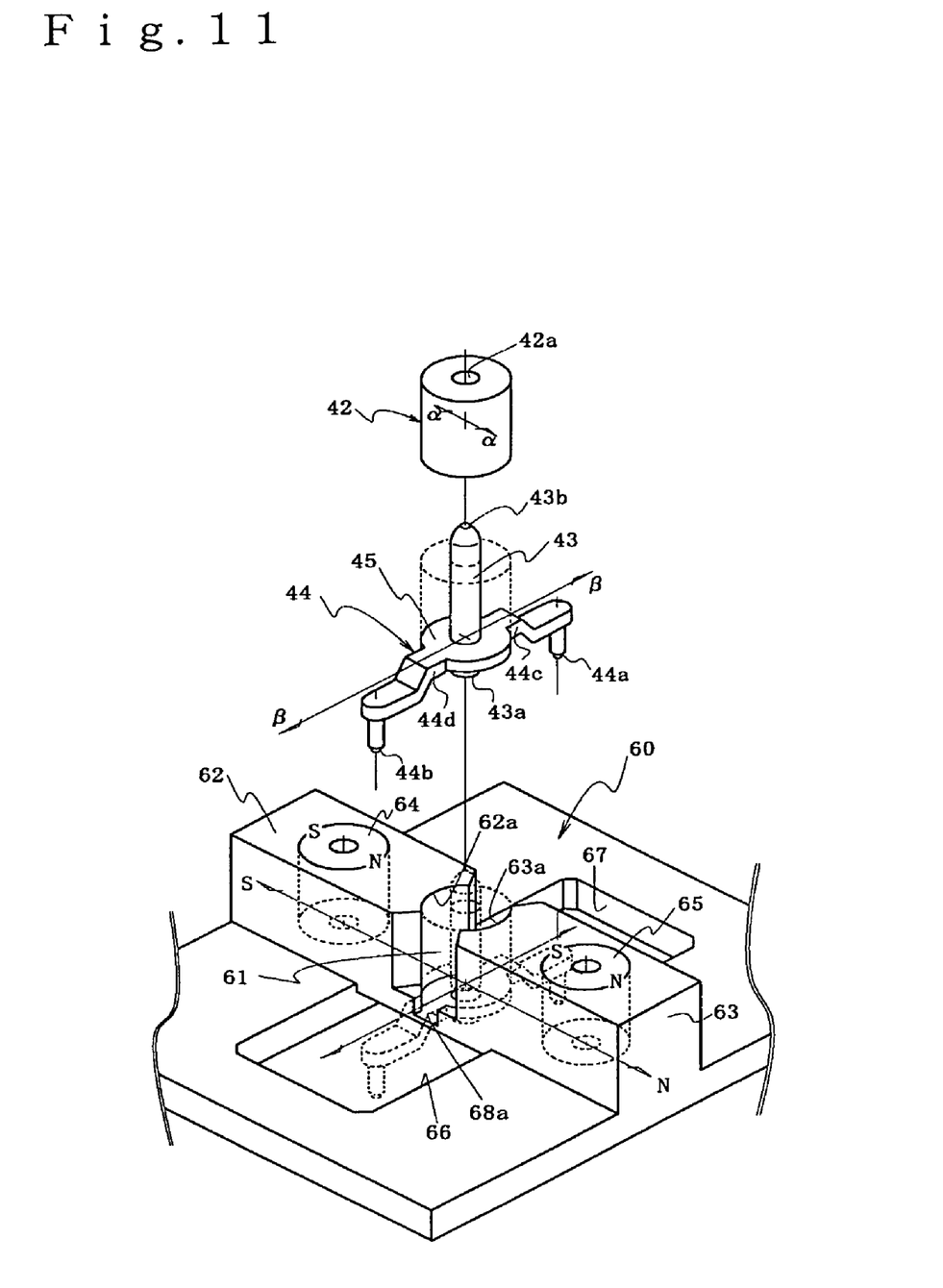
FIG. 11 is a view showing a fixture for integrally forming the magnet rotor according to the invention.

Next, a manufacturing method of the magnet rotor 41 will be described in detail with reference to FIGS. 11-13. FIG. 11 shows a fixture for uniting the permanent magnet 42 with the drive arm 44 by adhesive bonding, FIGS. 12A-12C show a bonding method thereof, and FIG. 13 is a process chart that explains bonding processes.

First, the permanent magnet 42 is formed, by using a mold in which a magnetic field is formed in a prescribed direction, turning neodymium magnetic material into an anisotropic magnet having an axis of easy magnetization in which magnetism is aligned in the prescribed direction.

On the other hand, the drive arm 44 is formed using a light-transmitting polycarbonate resin so that ultraviolet light (UV), an electron beam (EV), or visible light can be transmitted thereto for at least enabling a later-described adhesive to be cured. Then, a light curable resin 70 which is cured by radiation of ultraviolet light (UV), the electron beam (EV), or particular visible light is prepared as the adhesive.

Then, in a first process, the drive arm 44 is positioned and held in a fixing portion 61 of a fixture 60 having the fixing portion 61 in which a magnetic field N-S is formed in a prescribed direction, taking a prescribed posture "β-β" with respect to the direction of the magnetic field N-S. The magnetic field N-S is formed by magnets 64, 65 embedded respectively in pedestals 62, 63 forming the fixing portion 61 of the fixture 60. The drive arm 44 is positioned by supporting arm portions 44c, 44d fitted to positioning recessed portions 68a, 68b (not shown) formed below the fixing portion 61. Clearance holes 66, 67 are openings so that drive pins 44a, 44b of the drive arm 44 are not restricted.

Figures 12A, 12B, 12C:
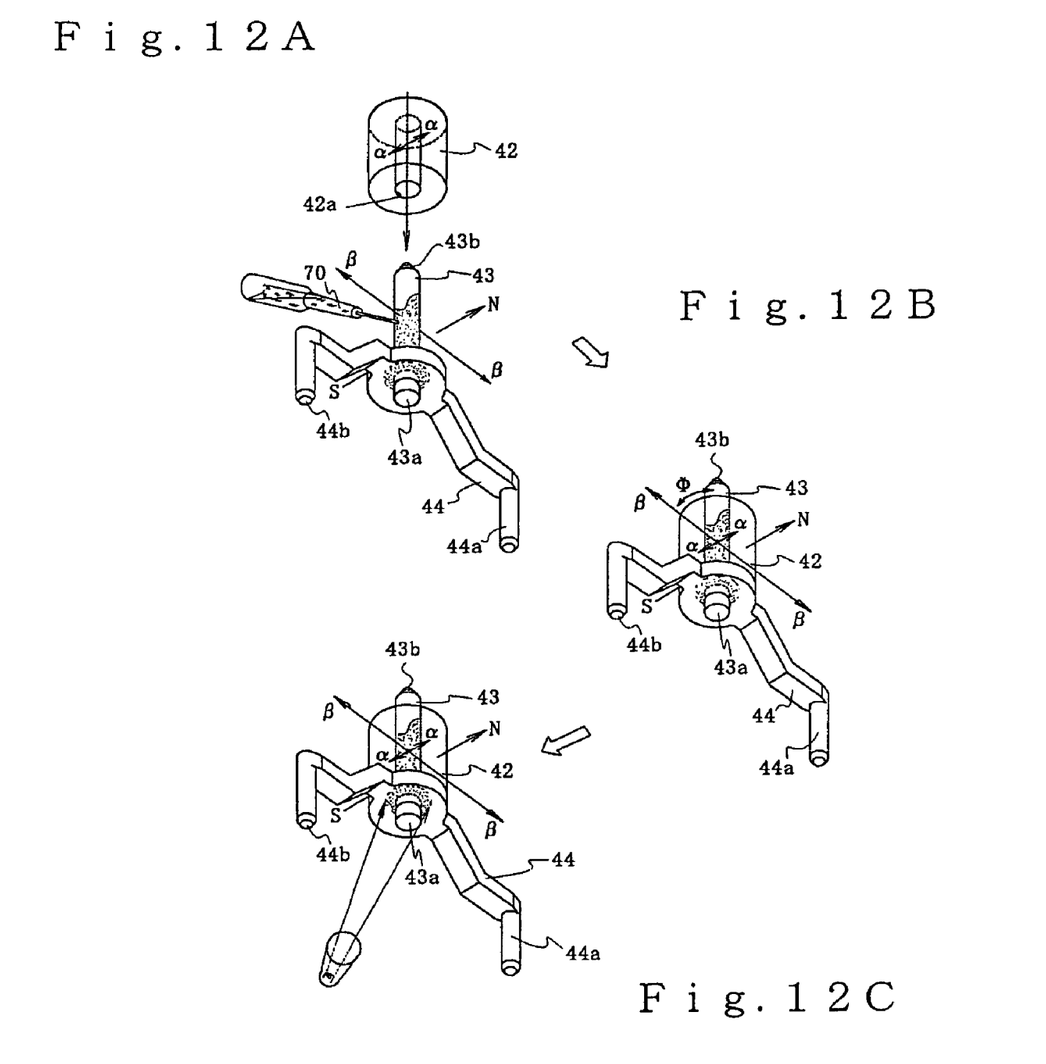
FIGS. 12A-12C show an adhesion method of the magnet rotor according to the invention.
Figure 13:
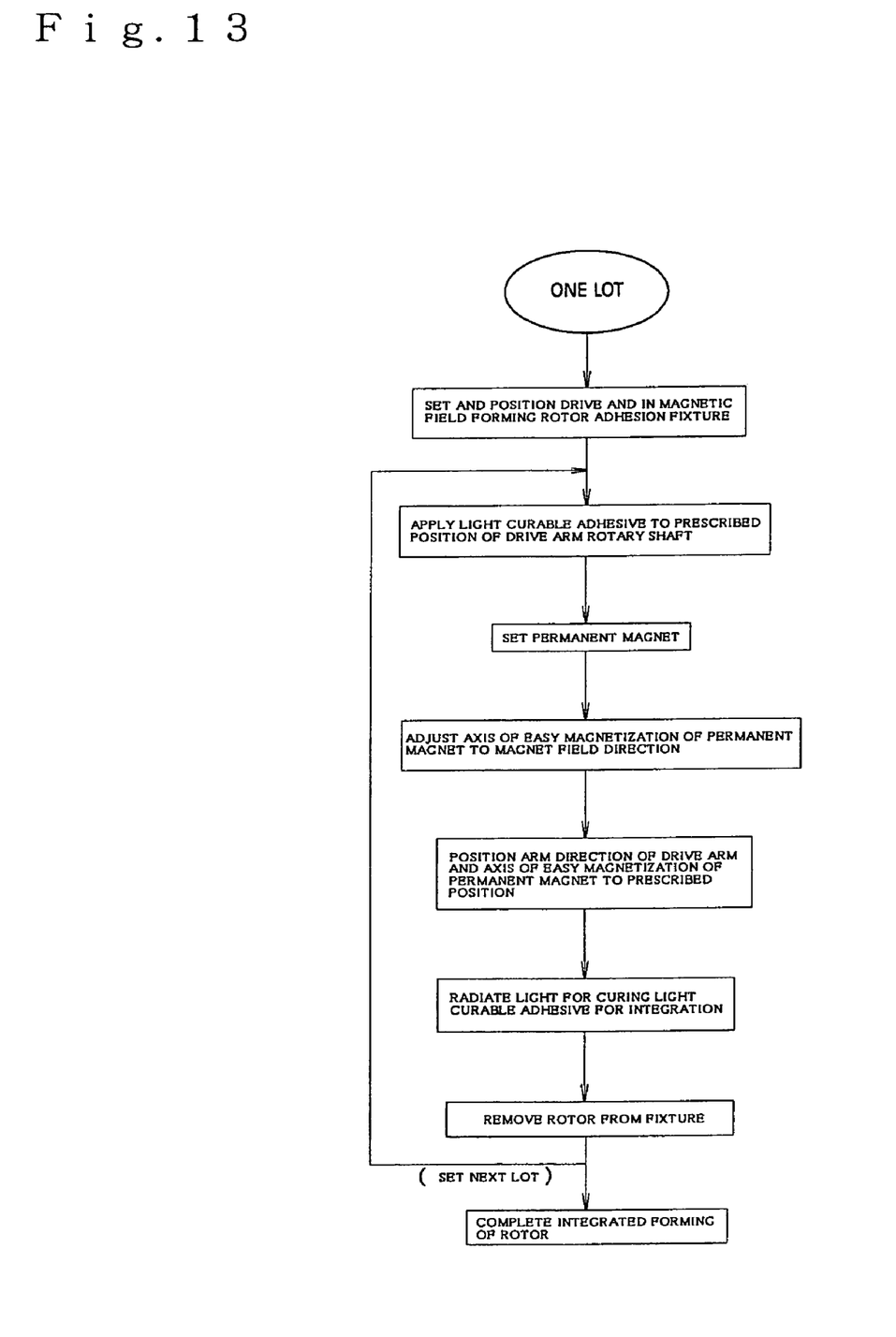
FIG. 13 is an adhesion process chart of the magnet rotor according to the invention.

Next, in a second process, as shown in FIG. 12A, the light curable resin 70 is applied to the rotary shaft 43 of the drive arm 44 which has been positioned and held, paying attention that the resin is not applied to the lower end shaft-receiving portion 43b.

Next, in a third process, a hollow portion 42a of the permanent magnet 42 is fitted to the rotary shaft 43 of the drive arm 44 to which the light curable resin 70 has been applied, which is set along magnet circumferential surface supporting curvature ends 62a, 63b formed in a fixing portion 61 of the fixture 60. At the same time as the setting, the axis of easy magnetization α-α of the permanent magnet 42 automatically turns so as to be parallel by the magnetic field N-S in the fixing portion 61 of the fixture 60, and the magnetic field N-S in the fixing portion 61 of the fixture 60 and the axis of easy magnetization α-α of the permanent magnet 42 become parallel to each other. As a result, the setting is performed in a prescribed relation between the posture direction "β-β" of the drive arm 44 and the direction of the axis of easy magnetization α-α of the permanent magnet 42. In the case of the described embodiment, the positional relationship is that of a right angle.

Next, in a fourth process, the permanent magnet 42 is magnetically held at a position where the direction of the axis of easy magnetization α-α corresponds to the direction of the magnetic field N-S.

Next, in a fifth process, the ultraviolet light (UV), the electron beam (EV), or the particular visible light is irradiated, allowing it to be transmitted through the light transmitting portion of the drive arm 44 in the state of holding magnetism to cure the light curable resin 70.

Lastly, in a sixth process, the permanent magnet 42 and the drive arm 44 which has been bonded by the light curable resin 70 are removed from the fixture 60 to obtain the magnet rotor 41.

The above processes are repeated a number of lot times as shown in FIG. 13 to manufacture the magnet rotors 41.

A reason for setting the fixture 60 being performed in a state that the lower end shaft-receiving portion 43b is directed upward is to not allow the light curable resin 70 applied to the rotary shaft 43 of the drive arm 44 to flow and adhere to the lower end shaft-receiving portion 43b. The light curable resin 70 does not flow along an upper end shaft-receiving portion 43a of another end by the existence of a flange portion 45 which abuts with a side surface of the permanent magnet 42 for positioning in the thrust direction.

In the embodiment, as the structure for biasing the spherical surface of the lower end shaft-receiving portion 43b acting on the rotary shaft 43 of the magnet rotor 41 to the side of the tapered surface 48a, as shown in FIG. 8, the central position in the longitudinal direction of the yoke 52 is displaced at displacement amount "L" with respect to the central position in the same direction as the permanent magnet 42. However, as another way, the same effect can be obtained by allowing a magnetic body to stand between lower coil frame 48 and the excitation coil 49 in an axial direction of the rotary shaft 43 of the magnet rotor 41.

As described above, in the invention, the light curable resin which is cured by radiation of the ultraviolet light (UV), the electron beam (EV), or particular visible light is used as an adhesive for the magnet rotor in which the drive arm having the rotary shaft is formed of the light transmitting resin, formed integrally by applying the adhesive between the rotary shaft of the drive arm and the central through hole of the hollow-cylindrical shaped permanent magnet formed into the anisotropic magnet having the axis of easy magnetization, through which the rotary shaft is inserted. Consequently, first, the adhesive is not mixed with a curing agent when using the adhesive as in the conventional way, as well as curing start time can be controlled, which is easy to address.

Secondly, after the curing starts, the resin is cured immediately with no leakage, even in a sealed portion. It is securely cured without curing spots, and as a result, a magnet rotor suitable for an electromagnetic drive device and a light quantity adjustment device can be obtained.

Additionally, a magnet rotor in which one of a pair of bearings has a conic-shaped tapered surface of which its center is the center axis of the rotary shaft, a sphere surface is provided at the rotary shaft, the center of which is the center axis thereof, and the sphere surface formed at the rotary shaft is abutted on the tapered surface of the bearing, as well as a biasing effect which biases the sphere surface toward the side of the tapered surface is given to the rotary shaft is used for an electromagnetic drive device. Therefore, it can be assured that the magnet rotor manufactured by the method of the application operates smoothly without staining the bearing portion with an adhesive.

The present application claims the right of priority based on Japanese Patent Application No. 2005-159895 filed May 31, 2005, and the disclosure thereof is incorporated by reference herein.

While the application is explained with reference to the specific embodiments of the invention, the explanation is illustrative, and the invention is limited only by the appended claims.

What is claimed is:

1. A magnet rotor comprising:
   a drive arm with a rotary shaft, the drive arm being composed of a light transmitting resin;
   an anisotropic permanent magnet having an axis of magnetization, the magnet having a cylindrical shape with a hollow center portion through which the rotary shaft is disposed, and
   a light curable resin interposed between the permanent magnet and the drive arm including the rotary shaft, the permanent magnet and the drive arm including the rotary shaft being bonded together with the light curable resin adhesive by light passing through the drive arm made of the light transmitting resin.

2. The magnet rotor according to claim 1, wherein the light curable resin adhesive is capable of being cured by irradiation of ultraviolet light, an electron beam, or visible light.

3. An electromagnetic drive device comprising:
   the magnet rotor according to claim 1; and
   an excitation coil capable of providing rotational torque to the magnet rotor according to a conducting direction of an electric current.

4. An electromagnetic drive device according to claim 3, further comprising:
   a coil frame having a pair of bearings rotatably supporting first and second ends of the rotary shaft, the excitation coil being wound around a periphery of the coil frame, and
   a yoke composed of a soft magnetic material and disposed at a periphery of the coil frame,
   wherein one of the pair of bearings has a conical-shaped tapered surface, a center of the tapered surface being a center axis of the rotary shaft,
   a spherical surface is provided at the rotary shaft, a center of the spherical surface being at the center axis, and
   the spherical surface of the rotary shaft abuts on the tapered surface of the bearing such that a biasing effect for biasing the spherical surface toward a side of the tapered surface is imparted to the rotary shaft.

5. A light quantity adjustment device comprising:
   a substrate having an optical axis opening;
   a blade member disposed in the substrate for regulating the optical axis opening; and
   the electromagnetic drive device according to claim 3 for driving the blade member open and closed, the drive arm of the electromagnetic drive device further comprising a drive pin for drive-connecting to the blade member.

6. A light quantity adjustment device according to claim 5, further comprising
   a coil frame having a pair of bearings rotatably supporting first and second ends of the rotary shaft, the excitation coil being wound around a periphery of the coil frame, and
   a yoke composed of a soft magnetic material and disposed at a periphery of the coil frame,
   wherein one of the pair of bearings has a conical-shaped tapered surface, a center of the tapered surface being a center axis of the rotary shaft,
   a spherical surface is provided at the rotary shaft, a center of the spherical surface being at the center axis, and
   the spherical surface of the rotary shaft abuts on the tapered surface of the bearing such that a biasing effect for biasing the spherical surface toward a side of the tapered surface is imparted to the rotary shaft.

7. The magnetic rotor according to claim 1, wherein the light curable resin is applied to the rotary shaft such that the light curable resin is not applied to a lower end shaft-receiving portion.

8. An electromagnetic drive device according to claim 4, wherein the yoke has a central position in a longitudinal direction thereof displaced with respect to a central position in a longitudinal direction of the permanent magnet so that the permanent magnet always receives magnetic biasing force moving to a center position of the yoke.

9. An electromagnetic drive device according to claim 6, wherein the yoke has a central position in a longitudinal direction thereof displaced with respect to a central position in a longitudinal direction of the permanent magnet so that the permanent magnet always receives magnetic biasing force moving to a center position of the yoke.

* * * * *